United States Patent [19]

Harris

[11] Patent Number: 5,231,115

[45] Date of Patent: Jul. 27, 1993

[54] SEEDED POROUS COPOLYMERS AND ION-EXCHANGE RESINS PREPARED THEREFROM

[75] Inventor: William I. Harris, Midland, Mich.

[73] Assignee: The Dow Chemical Company, Midland, Mich.

[21] Appl. No.: 810,948

[22] Filed: Dec. 19, 1991

[51] Int. Cl.$^5$ .............................................. C08J 5/20
[52] U.S. Cl. ...................................... 521/28; 521/25; 521/30; 521/31; 526/201; 526/203; 526/318; 526/318.25; 526/319; 526/336; 526/340; 526/347
[58] Field of Search .................... 521/28, 25; 526/201, 526/203

[56] References Cited

U.S. PATENT DOCUMENTS

| H915 | 5/1991 | Gibbs .................................... 521/25 |
|---|---|---|
| 2,500,149 | 3/1950 | Boyer . |
| 2,597,492 | 5/1951 | Hwa . |
| 2,597,493 | 5/1952 | Hwa . |
| 2,631,127 | 3/1953 | D'Alello . |
| 2,632,000 | 3/1953 | McMaster et al. . |
| 2,632,001 | 3/1953 | McMaster et al. . |
| 2,642,417 | 6/1953 | Wheaton et al. . |
| 2,764,564 | 9/1956 | McMaster et al. . |
| 2,888,441 | 5/1959 | Morris . |
| 2,960,480 | 11/1960 | Thielen . |
| 2,992,544 | 7/1961 | McMaster . |
| 3,311,602 | 3/1967 | Raley, Jr. . |
| 4,224,415 | 9/1980 | Meitzner .................................... 521/38 |
| 4,256,840 | 3/1982 | Meitzner et al. . |
| 4,419,245 | 12/1983 | Barrett .................................... 210/681 |
| 4,444,961 | 4/1984 | Timm . |
| 4,501,826 | 2/1985 | Meitzner .................................... 521/29 |
| 4,564,644 | 1/1986 | Harris . |
| 4,623,706 | 11/1986 | Timm et al. . |
| 4,666,673 | 5/1987 | Timm . |
| 4,950,332 | 8/1990 | Stringfield et al. . |
| 5,068,255 | 11/1991 | Harris . |

FOREIGN PATENT DOCUMENTS 0062088 10/1982 European Pat. Off. .
0168622 1/1986 European Pat. Off. .
0288006 10/1988 European Pat. Off. .
1151480 5/1969 United Kingdom .

OTHER PUBLICATIONS

Helfferich, Ion Exchange, (McGraw-Hill, 1962), pp. 35-36.
Schildknecht, Polymer Processes, "Polymerization in Suspension", Interscience Publishers, Inc., New York, 1959, Chapter III, pp. 69-109.
Rodriguez, Principles of Polymer Systems, (McGraw-Hill, 1970), pp. 18-23.
Billmeyer, Textbook of Polymer Science, (John Wiley & Sons, 1984) pp. 151-154.
Elias, Maccromolecules, (Plenum Press, 1977), vol. 1, pp. 205-210.

(List continued on next page.)

Primary Examiner—Jospeh L. Schofer
Assistant Examiner—Fred Zitomer

[57] ABSTRACT

The invention concerns preparation of porous copolymer beads by a seeded polymerization process employing gel copolymer seed particles. The process comprises initially providing a plurality of gel-type copolymer seed particles prepared by polymerization of at least one first monovinylidene monomer and a first cross-linking monomer. A second monomer mixture comprising at least one second monovinylidene monomer, a second cross-linking monomer, and a phase-separating diluent is thereafter imbibed by the seed particles and polymerized therein. The process is characterized by selecting the first monovinylidene monomers such that the phase-separating diluent and second monovinylidene monomers are capable of being imbibed by the seed particles in an amount sufficient to form a porous copolymer. The porous copolymer beads produced have stable polymeric structures and good physical properties that render them useful in preparing ion-exchange resins and polymeric adsorbents.

30 Claims, 3 Drawing Sheets

OTHER PUBLICATIONS

Brandrup et al., Polymer Handbook, (Interscience Publishers, 1966) pp. IV-341-IV-368.

CRC Handbook of Chemistry and Physics, 71st Ed., (1990), pp. 9-6 to 9-8.

Reid et al., The Properties of Gases and Liquids, 3rd. Ed., (McGraw-Hill, 1977), pp. 629-665.

Klempner et al., Advances in Interpenetrating Polymer Networks, vol. 1, pp. 41-67, (Technomic Publishing Co., Inc.).

Dragan et al., Reactive Polymers, "2-Ethyl-1-Hexanol as Diluent in the Synthesis of Styrene-Divinylbenzene Copolymers and Anion Exchangers", 5 (1987), pp. 123-131.

Bloom, "Seeded Suspension Polymerization", Lehigh University, 1982.

SEEDED POROUS COPOLYMERS AND ION-EXCHANGE RESINS PREPARED THEREFROM

BACKGROUND OF THE INVENTION

This invention concerns copolymer beads suitable as a support matrix for ion-exchange resins and polymeric adsorbents. In particular, the invention concerns porous copolymer beads prepared by a seeded polymerization process.

Ion-exchange resins are used by industry to separate chemical species from solutions containing them. Such resins are prepared by substituting various functional groups onto a copolymer bead matrix. The functional groups are capable of associating with the impurities so as to remove them from solution. Ion-exchange resins may be cation-, anion- or chelate-exchange resins, depending on the choice of functional group substituted onto the copolymer bead matrix. The copolymer bead matrix may also be used in preparing polymeric adsorbents, such as those disclosed in U.S. Pat. No. 4,950,332.

The copolymer bead matrix is typically prepared by suspension polymerization of a finely divided organic phase comprising monovinylidene monomers like styrene, polyvinylidene monomers such as divinylbenzene, a freeradical initiator, and, optionally a phase-separating diluent. The copolymer beads produced may be microporous, i.e., gellular in character, or macroporous, the result depending upon whether the phase-separating diluent is employed. The term "macroporous" as commonly used in the art means that the copolymer has both macropores and mesopores. The terms "microporous", "gel" and "macroporous" are well-known in the art and generally describe the nature of the copolymer bead porosity. Microporous or gel copolymer beads have pore sizes on the order of less than about 20 Angstroms (Å), while macroporous copolymer beads have both mesopores of from about 20 Å to about 500 Å and macropores of greater than about 500 Å. Gel and macroporous copolymer beads, as well as their preparation, are further discussed in U.S. Pat. No. 4,256,840.

Recently, industry has focused on methods of preparing copolymer beads in multi-staged polymerizations, also known as seeded polymerization processes. Such copolymer beads are desirable due to good mechanical strength and osmotic shock resistance. Seeded polymerization processes can also prepare beads of relatively uniform size if the seed particles employed have similar size uniformity. U.S. Pat. Nos. 4,419,245 and 4,564,644 disclose processes wherein seed particles are suspended in a continuous medium and, thereafter, the seed particles are imbibed and polymerized with additional monomer to form copolymer beads. British Patent 1,151,480 discloses a process wherein copolymer beads are prepared from porous seed particles.

Other seeded polymerization processes are known. European Patent Application No. 0 062 088 (Oct. 13, 1982) discloses preparation of gel or macroporous copolymer beads by a seeded polymerization process. However, macroporous copolymer beads made from gel seeds according to this process do not have stable polymeric structures and generally are heterogeneous in porosity, i.e., some discrete portions of the beads are gellular, while other portions are macroporous. Such heterogeneous beads are undesirable due to poor physical strength. European Patent Application No. 0 168 622 (Jan. 22, 1986) concerns preparation of macroporous copolymer beads by a seeded polymerization process using macroporous seed particles. This process is limited by its inability to substantially increase the size of the copolymer bead product relative to the size of the seed particles.

In conducting a seeded polymerization, it is more advantageous to employ gel rather than macroporous seed particles. Gel seed particles, especially those with low levels of crosslinking monomer therein, i.e., less than about 5 weight percent based on weight of the seed particle, have a substantially better capability for imbibing additional monomers in a subsequent polymerization step. The greater ability to imbibe monomers allows for production of a copolymer bead product having a substantially greater volume, i.e., at least about 300 percent larger in size, relative to the initial size of the gel seed particle. On the other hand, when macroporous seed particles are employed it is difficult to obtain a significant increase in particle size and the pores of the seed particle are constricted by formation of new polymer.

As can be seen, it is desirable to develop a seeded polymerization process for producing porous copolymer beads which is economical and capable of preparing beads having a stable polymeric structure and good physical properties. The resulting porous copolymer beads could then be used to prepare ion-exchange resins and polymeric adsorbents.

SUMMARY OF THE INVENTION

The above-described objects and advantages are obtained by a process for preparing porous copolymer beads comprising the following steps:

Initially, a plurality of gel-type, copolymer seed particles is provided. The seed particles are prepared by polymerization of a first monomer mixture comprising at least one first monovinylidene monomer and a first cross-linking monomer. The seed particles optionally contain a free radical source therein capable of initiating polymerization of ethylenically unsaturated monomers.

Thereafter, the seed particles are imbibed with a second monomer mixture comprising a phase-separating diluent, at least one second monovinylidene monomer, a second cross-linking monomer, and a free-radical polymerization initiator. The free-radical initiator is optional for embodiments wherein the seed particles contain a free radical source. The phase-separating diluent and the at least one second monovinylidene monomer are selected so as to have a solubility parameter and dipole moment which are compatible with the solubility parameter and dipole moment of the at least one first monovinylidene monomer such that at least about 70 percent by weight of the second monomer mixture is imbibed by the seed particles.

The imbibed seed copolymer particles are thereafter maintained under suspension polymerizing conditions for a time sufficient to achieve a desired degree of conversion of monomer to copolymer and obtain the porous copolymer beads.

DETAILED DESCRIPTION OF THE INVENTION

Figure 1:
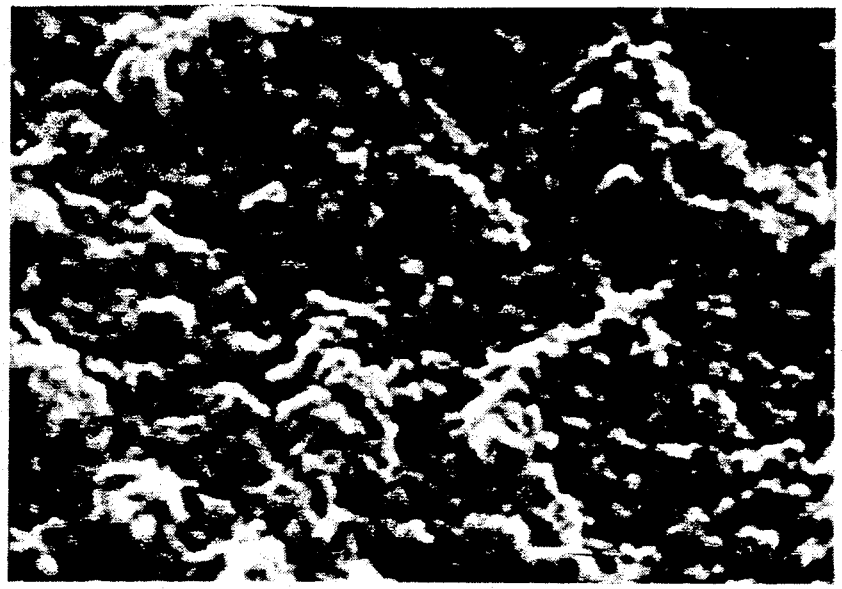
FIG. 1 is a photomicrograph of a porous copolymer bead prepared in Example 2.

Seeded polymerizations, also known as continuous or semi-continuous staged polymerizations, are generally described in U.S. Pat. Nos. 4,419,245 and 4,564,644, the relevant teachings of which are incorporated herein by reference. A seeded polymerization process typically adds monomers in two or more increments, each increment comprising at least about 5 percent, and preferably at least about 10 percent of the weight of the resulting copolymer beads. Each increment is followed by complete or substantial polymerization of the monomers therein before adding a subsequent increment.

A seeded polymerization is advantageously conducted as an suspension polymerization wherein monomers, or mixtures of monomers and seed particles, are dispersed and polymerized within a continuous suspending medium. In such a process, staged polymerization is readily accomplished by forming an initial suspension of monomers, wholly or partially polymerizing the monomers to form seed particles, and subsequently adding remaining monomers in one or more increments. Each increment may be added at once, or continuously. Due to the insolubility of ethylenically unsaturated monomers in the suspending medium and their solubility within the seed particles, the monomers are imbibed by the seed particles and polymerize therein. Multistaged polymerization techniques can vary in the amount and type of monomers employed for each stage, as well as the polymerizing conditions employed.

The gel copolymer seed particles employed may be prepared by known suspension polymerization techniques. In general, the seed particles may be prepared by forming a suspension of a first monomer mixture in an agitated, continuous suspending medium, as described by F. Helfferich in *Ion Exchange*, (McGraw-Hill 1962) at pps. 35-36. The first monomer mixture comprises at least one first monovinylidene monomer, a first cross-linking monomer, and an effective amount of a first free-radical initiator. The suspending medium may contain one or more suspending agents commonly employed in the art. Polymerization is initiated by heating the suspension to a temperature of generally from about 50° C. to about 90° C. The suspension is maintained at such temperature until reaching a desired degree of conversion of monomer to copolymer. Other suitable polymerization methods are described in U.S. Pat. Nos. 4,444,961; 4,623,706; and 4,666,673.

The monomers employed herein are addition polymerizable ethylenically unsaturated compounds. Such monomers are well-known and reference is made to *Polymer Processes*, edited by Calvin E. Schildknecht, published in 1956 by Interscience Publishers, Inc., New York, Chapter III, "Polymerization in Suspension" at pp. 69-109 for purposes of illustration.

In Table II on pp. 78-81 of Schildknecht are listed diverse kinds of monomers which are suitable in practicing this invention. Of such ethylenically unsaturated monomers, of particular interest are water-insoluble monovinylidene monomers including the monovinylidene aromatics such as styrene, vinyl naphthalene, alkylene-substituted styrenes (particularly monoalkyl-substituted styrenes such as vinyltoluene and ethylvinylbenzene) and halo-substituted styrenes, such as bromo- or chlorostyrene and vinylbenzylchloride; other monovinylidene monomers like esters of $\alpha,\beta$-ethylenically unsaturated carboxylic acids, particularly acrylic or methacrylic acid, methyl methacrylate, ethylacrylate; and mixtures of one or more of said monomers. Also suitable are diverse polyvinylidene compounds which may be employed as cross-linking monomers, such as polyvinylidene aromatics like divinylbenzene, divinyltoluene, divinylxylene, divinylnaphthalene, trivinylbenzene, divinyldiphenyl ether, divinyldiphenylsulfone, as well as diverse alkylene diacrylates and alkylene dimethacrylates. Preferred cross-linking monomers are divinylbenzene, trivinylbenzene, and ethyl glycol dimethacrylate. The monomers used in each polymerization step may be the same or different as those used in other steps.

It is advantageous to select monomers for preparing the seed particles such that the copolymer formed has a sufficiently high glass transition temperature ("$T_g$") to minimize seed particle agglomeration. Preferred seed copolymers are those having a $T_g$ of about 30° C. or more.

In practicing the invention, it is also important to employ first monovinylidene monomers in preparing the seed particles which will be compatible with the phase-separating diluent and second monovinylidene monomers, as described hereinafter, employed in subsequent polymerization steps. By "compatible", it is meant that the first monovinylidene monomers have a solubility parameter and dipole moment that allow the resulting seed particles to imbibe at least about 70 weight percent of the second monomer mixture. Desirably, the first monovinylidene monomers are selected such that at least about 80 weight percent, preferably at least about 90 weight percent, and more preferably at least about 95 weight percent of the second monomer mixture is imbibed. In the most preferred embodiments, substantially all of the second monomer mixture is imbibed by the seed particles. In general, compatible first monovinylidene monomers are selected by matching their solubility parameters and dipole moments with those of the phase-separating diluent and second monovinylidene monomers.

Solubility parameter (also referred to symbolically as "$\delta$" hereinafter) is a measure of the solubility between various polymers and/or solvents and is generally discussed by F. Rodriguez in *Principles of Polymer Systems* at pp. 18-23 (McGraw-Hill 1970), F. Billmeyer in *Textbook of Polymer Science* at pps. 151-154 (John Wiley & Sons 1984), and H. Elias in *Macromolecules*, Vol. 1, at pps. 205-210 (Plenum Press 1977), the relevant teachings of which are incorporated herein by reference. Solubility parameter values for various solvents and polymers are listed by H. Burrell and B. Immergut in *Polymer Handbook* (Interscience Publishers 1967) at pps. IV-341 to IV-368. For a given first monovinylidene monomer, compatible phase-separating diluents and second monovinylidene monomers desirably have a solubility parameter within about $\pm 30$ percent of the solubility parameter for the first monovinylidene monomer. Preferably, the solubility parameters of the diluent and monomer are within about $\pm 20$ percent and most preferably within about $\pm 10$ percent of the first monovinylidene monomer's solubility parameter. As used hereinafter, δ values are quoted in terms of (cal/cm$^3$)$^{\frac{1}{2}}$, unless stated otherwise.

To match the hydrogen bonding characteristics of the first monovinylidene monomer with that of the phase-separating diluent and second monovinylidene monomer, it is desirable to have their respective dipole moments be within about ±1.0 debyes of each other, preferably within about 0.5 debyes, and more preferably within 0.25 debyes. Dipole moments for various compounds are given, for example, in the *CRC Handbook of Chemistry and Physics*, 71st Ed. (1990) at pps. 9-6 to 9-8 and by Reid et al. in *The Properties of Gases and Liquids*, 3rd Ed. (McGraw-Hill 1977) at pps. 629-665.

As an example, where a non-polar, aliphatic solvent like hexane, heptane, or iso-octane (which have essentially no dipole moment) is selected as the phase-separating diluent, the first monovinylidene monomer preferably has a solubility parameter of preferably no greater than about 9.9, more preferably no greater than about 8.6, and most preferably no greater than about 8.2. Examples of such preferred aliphatic monomers are tert-butyl styrene (δ of 8.0), isobornylmethacrylate (δ of 8.2), laurylmethacrylate (δ of 8.2), vinyltoluene (δ of 9.2), ethylvinylstyrene (δ of 8.9), and mixtures thereof. Also suitable are mixtures of such aliphatic monomers with other monovinylidene monomers, such as styrene or alkyl-substituted styrenes, provided that the mixture, collectively, has a compatible solubility parameter and dipole moment, as previously described herein.

Where a relatively polar solvent like sec-butanol (δ of 11.1 and dipole moment of 1.70 debyes) is employed, suitable first monovinylidene monomers are also polar in nature, such as acrylonitrile (δ of 10.6 and dipole moment of 1.70 debyes). By "polar", it is meant that the particular monovinylidene monomer has a solubility parameter advantageously greater than about 9.9. Similarly, mixtures of such polar monomers with other monovinylidene monomers are suitable, provided that the mixture, collectively, has a compatible solubility parameter and dipole moment, as previously described.

Other suitable combinations of first monovinylidene monomers with phase-separating diluents and second monovinylidene monomers will become apparent upon reading the disclosure herein.

The proportion of cross-linking monomer in the gel copolymer seed particles should be sufficient to render the particles insoluble in subsequent polymerization steps (and also on conversion to an ion-exchange resin), yet still allow for adequate imbibition of the phase-separating diluent and monomers of the second monomer mixture. Generally, a suitable amount of cross-linking monomer in the seed particles is minor, i.e., desirably from about 0.01 to about 5 weight percent, preferably from about 0.1 to about 2.5 weight percent, and most preferably from about 0.2 to about 1.5 weight percent based on total weight of monomers in the seed particles, with the balance comprising the first monovinylidene monomer.

Phase-separating diluents useful in conducting the invention are those which are a solvent for the monomers employed, but are non-solvents for the resulting copolymer. As such, the copolymer precipitates from the monomer phase as it is formed. Suitable phase-separating diluents are organic solvents which are substantially inert with respect to the suspending medium, monomers, and resulting copolymer. Generally, organic solvents having boiling points of at least about 60° C. are suitable and include aromatic hydrocarbons, aliphatic hydrocarbons, halogenated hydrocarbons, and aliphatic alcohols. Examples of suitable diluents are hexane, heptane, iso-octane (2,2,4-trimethylpentane), benzene, toluene, xylene, tert-amyl alcohol, n-butanol, sec-butanol, 2-ethylhexanol, and decanol. Other phase-separating diluents are described in U.S. Pat. Nos. 4,224,415 and 3,176,482, the relevant teachings of which are incorporated herein by reference. The choice of diluent will depend on the particular monomers being polymerized as previously discussed. The amount of diluent used can also vary depending on the type and proportion of monomers employed, but generally an adequate amount will be from about 20 to about 50 weight percent, based on total weight of the second monomer mixture.

Polymerization of the first monomer mixture may be conducted to a point short of substantially complete conversion of the monomers to copolymer or, alternatively, to substantially complete conversion. If incomplete conversion is desired, the resulting partially polymerized seed particles advantageously contain a free-radical source therein capable of initiating further polymerization in subsequent polymerization stages. The term "free-radical source" refers to the presence of free-radicals, a residual amount of free-radical initiator, or both, which is capable of inducing further polymerization of ethylenically unsaturated monomers. In such an embodiment of the invention, it is preferable that from about 20 to about 95 weight percent of the first monomer mixture, based on weight of the monomers therein, be converted to copolymer, and more preferably from about 50 to about 90 weight percent. Due to the presence of the free-radical source, the use of a free-radical initiator in a subsequent polymerization stage would be optional. For embodiments where conversion of the first monomer mixture is substantially complete, it may be necessary to use a free-radical initiator in subsequent polymerization stages.

The free-radical initiator may be any one or a combination of conventional initiators for generating free-radicals in the polymerization of ethylenically unsaturated monomers. Representative initiators are UV radiation and chemical initiators, such as azo-compounds like azobisisobutyronitrile; and peroxygen compounds such as benzoyl peroxide, t-butylperoctoate, t-butylperbenzoate and isopropylpercarbonate. Other suitable initiators are mentioned in U.S. Pat. Nos. 4,192,921; 4,246,386; and 4,283,499. The free-radical initiators are employed in amounts sufficient to induce polymerization of the monomers in a particular monomer mixture. The amount will vary, as those skilled in the art can appreciate, and will depend generally on the type of initiators employed, as well as the type and proportion of monomers being polymerized. Generally, an amount of from about 0.02 to about 2 weight percent is adequate, based on total weight of the monomer mixture.

The first monomer mixture used to prepare the seed particles is advantageously suspended within an agitated suspending medium comprising a liquid that is substantially immiscible with the monomers, preferably water. Generally, the suspending medium is employed in an amount from about 30 to about 70, and preferably from about 35 to about 50 weight percent based on total weight of the monomer mixture and suspending medium. Various suspending agents are conventionally employed to assist with maintaining a relatively uniform suspension of monomer droplets within the suspending medium. Illustrative suspending agents are gelatin, polyvinyl alcohol, magnesium hydroxide, hydroxyethylcellulose, methylcelluloses, and carboxymethylmethylcellulose. Other suitable suspending agents are disclosed in U.S. Pat. No. 4,419,245. The amount of suspending agent used can vary widely depending on the monomers and suspending agents employed.

The seed particles may be of any convenient size. In general, the seed particles desirably have a volume average particle diameter of from about 75 to about 1000 microns, preferably from about 150 to about 800 microns, and more preferably from about 200 to about 600 microns. Volume average particle diameter may be determined by a commercially available instrument designed to make such measurement, such as a Criterion Model PC-320 Particle Size Analyzer available from the HIAC-Royco Company. Volume average particle diameter may also be determined by screen analysis, such as ASTM D-2187-74, using appropriate screen sizes.

Porous copolymer beads may be prepared by providing a plurality of the gel seed particles and, thereafter, adding the second monomer mixture (which contains diluent) such that the mixture is imbibed by the seed particles and polymerization conducted therein. This step is preferably conducted as a batch-seeded process or as an insitu batch-seeded process, as described hereinafter. The second monomer mixture may also be added intermittently or continuously under polymerizing conditions, such as in U.S. Pat. No. 4,564,644 previously discussed.

In the so-called batch-seeded process, gel seed particles comprising from about 10 to about 40 weight percent of the porous copolymer bead product are preferably suspended within a continuous suspending medium. A second monomer mixture containing a free radical initiator is then added to the suspended seed particles, imbibed thereby, and then polymerized. Although less preferred, the seed particles can be imbibed with the second monomer mixture prior to being suspended in the continuous suspending medium. The second monomer mixture may be added in one amount or in stages. The second monomer mixture is preferably imbibed by the seed particles under conditions such that substantially no polymerization occurs until the mixture is substantially fully imbibed by the seed particles. The time required to substantially imbibe the monomers will vary depending on the copolymer seed composition and the monomers imbibed therein. However, the extent of imbibition can generally be determined by microscopic examination of the seed particles. The second monomer mixture desirably contains from about 3 to about 25, preferably from about 5 to about 20 weight percent of cross-linking monomer based on total weight of monomers in the second monomer mixture, with the balance being the second monovinylidene monomer.

In an insitu batch-seeded process, gel seed particles comprising from about 10 to about 40 weight percent of the porous copolymer bead product are initially formed by suspension polymerization of the first monomer mixture. The gel seed particles can have a free-radical source therein as previously described, which is capable of initiating further polymerization. Optionally, a polymerization initiator can be added with the second monomer mixture where the seed particles do not contain an adequate free radical source or where additional initiator is desired. In this embodiment, seed preparation and subsequent polymerization stages are conducted insitu within a single reactor. A second monomer mixture is then added to the suspended seed particles, imbibed thereby, and polymerized. The second monomer mixture may be added under polymerizing conditions, but is preferably added to the suspending medium under conditions such that substantially no polymerization occurs until the mixture is substantially fully imbibed by the seed particles. The composition of the second monomer mixture corresponds to the description previously given for the batch-seeded embodiment.

Preferred second monovinylidene monomers include monovinylidene aromatics, particularly styrene, or a mixture of styrene with a monoalkyl- or halo-substituted styrene, and vinylbenzylchloride; esters of $\alpha,\beta$-ethylenically unsaturated carboxylic acids, particularly methyl methacrylate or methacrylonitrile; and mixtures thereof. Such monomers are preferred due to their commercial availability and relatively low cost.

Conditions employed to polymerize ethylenically unsaturated monomers are well-known in the art. Generally, the monomers are maintained at a temperature of from about 50° C. to about 90° C. for a time sufficient to obtain a desired degree of conversion. Typically, an intermediate temperature of from about 60° C. to about 80° C. is maintained until conversion of monomer to copolymer is substantially complete and, thereafter, the temperature is increased to complete the reaction. The resulting porous copolymer beads may be recovered from the suspending medium by conventional methods.

The porous copolymer beads obtained desirably have a volume average particle diameter of from about 95 to about 1700 $\mu$m, and preferably from about 190 to about 1350 $\mu$m. Bead size is determined primarily by the size of the seed particles employed and a swelling ratio, as this term is described hereinafter.

The porous copolymer beads advantageously have substantially increased weight (and also volume) in comparison to the weight of the seed particles from which they are made. As used herein, the term "swelling ratio" refers to this result and is a number determined by dividing the weight of the product porous beads by the weight of the seed particles employed. Desirably, the swelling ratio achieved in producing the porous copolymer bead product is from about 1.5 to about 10, preferably from about 2 to about 6, and more preferably from about 3 to about 5.

With respect to porosity, the porous copolymer beads have an average pore size which is generally smaller in comparison to conventional macroporous copolymer beads. The porous copolymer beads also have a pore size distribution which is generally narrower than a typical macroporous copolymer. Thus, the term "porous copolymer" used herein refers to the relatively small pores and narrow pore size distribution of beads prepared according to the invention, when compared to conventional macroporous copolymer beads prepared in a single stage (non-seeded), suspension polymerization. The porous copolymer beads advantageously have a treated bulk density of from about 0.2 to about 0.6 g/cm$^3$ and a specific surface area of from about 2 to about 75 m$^2$/g as determined by BET nitrogen adsorption techniques. The beads advantageously have a porosity value of from about 0.1 to about 2.5 cm$^3$/g. Pore size and pore size distributions are illustrated, for example, by FIGS. 1-4 discussed hereinafter.

If desired, the porous copolymer beads may be converted to ion-exchange resins by functionalizing them with ion-exchange functional groups. Techniques for converting copolymer beads to anion-, cation-, and chelate-exchange resins are known.

In preparing anion- and chelate-exchange resins from poly(vinylaromatic) copolymer beads, such as crosslinked polystyrene beads, the beads are first haloalkylated, preferably halomethylated, and most preferably chloromethylated, and the anion- or chelate-exchange groups are subsequently substituted onto the haloalkylated copolymer.

Methods for haloalkylating copolymer beads and attaching anion-exchange or chelating groups are described in U.S. Pat. Nos. 2,642,417; 2,960,480; 2,597,492; 2,597,493; 3,311,602; 2,632,000; 2,632,001; and 2,992,544, the relevant teachings of which are incorporated herein. In general, the copolymer beads are haloalkylated by first swelling the copolymer with a haloalkylating agent, such as bromomethylmethylether, chloromethylmethylether, or a mixture of formaldehyde and hydrochloric acid, and thereafter reacting the copolymer with the haloalkylating agent in the presence of a Friedel-Crafts catalyst.

Anion- or chelate-exchange resins may be prepared from the haloalkylated beads by contact with an amine compound capable of replacing the halogen of the haloalkyl group with an amine-based functional group. Suitable compounds and methods for preparing such resins are also illustrated in the patents and article discussed in the preceding paragraph. Weak-base anion resins may be prepared by contacting the haloalkylated copolymer beads with ammonia, a primary amine, a secondary amine, or polyamines like ethylene diamine or propylene diamine. Commonly employed primary and secondary amines include methylamine, ethylamine, butylamine, cyclohexylamine, dimethylamine, and diethylamine. Strong-base anion resins may be prepared by contact with tertiary amines, such as trimethylamine, triethylamine, dimethylisopropanolamine, or ethylmethylpropylamine. Chelate resins may be prepared, for example, by contacting the haloalkylated copolymer beads with an aminopyridine compound, such as a 2-picolylamine. Chelate-exchange resins may also be prepared by contacting the haloalkylated copolymer beads with a primary amine to initially convert the copolymer beads to a weak-base anion-exchange resin, followed by contact with a carboxyl-containing compound, like chloroacetic acid, as described in U.S. Pat. No. 2,888,441.

Amination typically comprises contacting the haloalkylated copolymer beads with about a stoichiometric amount of the amine compound at a temperature of from about 25° C. to about 150° C. for at least about one hour.

Cation-exchange resins may be prepared from the copolymer beads using methods illustrated by U.S. Pat. Nos. 3,266,007; 2,500,149; 2,631,127; 2,664,801; and 2,764,564, the relevant teachings of which are incorporated herein. In general, strong acid resins are prepared by reacting the copolymer with a sulfonating agent such as sulfuric acid, chlorosulfonic acid, or sulfur trioxide. Contact with the sulfonating agent can be conducted neat, or with a swelling agent. Contact may be conducted at temperatures from about 0° C. to about 150° C.

The resulting cation-exchange resin may be converted to a desired metal salt form by contact with an aqueous solution of a salt or base containing the desired metal counterion. For example, the resin can be converted to its calcium form by contact with a $CaCl_2$ or $Ca(OH)_2$ solution. The resin can be converted to other forms in like manner using suitable water-soluble salts of the desired metal.

SPECIFIC EMBODIMENTS OF THE INVENTION

The following examples illustrate the invention and should not be construed to limit the scope of the appended claims. All parts and percentages are by weight and all temperatures are in degrees Celsius (° C.), unless stated otherwise.

EXAMPLE 1

This example concerns preparation of porous copolymer beads by seeded polymerization of gel copolymer seeds containing equal parts of styrene and isobornylmethacrylate. The example also concerns preparation of anion-exchange resins from the porous copolymer beads.

SEED PREPARATION

In a 4 liter polymerization kettle, a first monomer mixture containing 464 grams of styrene, 464 grams of isobornylmethacrylate, 0.84 grams of a commercially available 55.7 percent divinylbenzene solution (the balance being essentially ethylvinylbenzene), and as free-radical polymerization initiators, 0.46 grams of t-butyl perbenzoate and 1.86 grams of a 50 percent solution of t-butyl peroctoate, is suspended in a continuous aqueous suspending medium. The divinylbenzene solution is commercially available from The Dow Chemical Company and the isobornylmethacrylate is available from Rohm & Haas Company. The aqueous suspending medium consists of 2.5 grams of a 60 percent aqueous solution of sodium dichromate as a latex inhibitor, 375 grams of a 1 percent aqueous carboxymethylmethylcellulose (CMMC) solution, and 873 grams of water.

After charging the kettle, agitation is initiated to size the first monomer mixture into droplets. The kettle is then sealed, nitrogen purged, and maintained at a temperature of 70° C. for 15 hours with agitation. Thereafter, the kettle is maintained at a temperature of 110° C. for another 4 hours to complete the reaction. The resulting seed particles are recovered from the reactor, washed thoroughly with water, and dried at room temperature. The seed particles have a divinylbenzene content of 0.05 percent based on the total weight of the copolymer beads.

The seed particles have the following particle size distribution as determined by screen analysis:

| Particle Diameter (μm) | Weight Percent |
| --- | --- |
| greater than 841 | 0.2 |
| 841 to 707 | 0 |
| 707 to 595 | 0.2 |
| 595 to 500 | 0.4 |
| 500 to 420 | 2.8 |
| 420 to 354 | 40.9 |
| 354 to 297 | 24.9 |
| 297 to 250 | 9.1 |
| 250 to 177 | 12.6 |
| less than 177 | 8.9 |

BEAD PREPARATION

A 100 gram portion of the seed particles corresponding to the 420 to 354 μm particle size range is used hereinafter. The seed particles are placed in a bottle and a second monomer mixture consisting of 455 grams of styrene, 95 grams of the divinylbenzene solution previously described, 450 grams of commercial grade iso-octane (essentially 2,2,4-trimethylpentane) and as free-radical polymerization initiators, 1.63 grams of the 50 percent solution of t-butyl peroctoate solution and 1.09 grams of t-butyl perbenzoate, is added in sequential steps as described hereinafter.

An initial charge of 248 grams of styrene, 52 grams of the divinylbenzene solution, and the t-butyl peroctoate solution and t-butyl perbenzoate is added to the bottle. Thereafter, the bottle is placed on a bottle roller and rolled until essentially all of the initial charge is imbibed by the seed particles. A second charge is then added consisting of 207 grams of styrene, 43 grams of the divinylbenzene solution, and 250 grams of iso-octane and again rolled on the bottle roller until essentially all of the second charge is imbibed. Thereafter, another 200 grams of iso-octane is added to the bottle and imbibed by the seed particles in the same fashion.

The imbibed seed particles are then placed into the polymerization kettle and dispersed into a continuous aqueous suspending medium consisting of 2.5 grams of a 60 percent aqueous sodium dichromate solution, 223 grams of a 1 percent aqueous carboxymethyl methylcellulose (CMMC) solution, and 775 grams of water. The kettle is sealed, nitrogen purged, and maintained at a temperature of 80° C. for 15 hours with agitation. Thereafter, the kettle is maintained at a temperature of 110° C. for an additional five hours to complete the reaction. The resulting porous copolymer beads are recovered from the kettle, washed, and steam distilled to remove residual iso-octane. The beads are washed a final time with water and air dried. The porous copolymer beads appear essentially uniform in size and are opaque.

The porous copolymer beads are measured to determine various physical properties. The properties are:

| Treated Bulk Density | 0.323 gram/cm$^3$ |
| Porosity | 1.074 cm$^3$/gram |
| Average Pore Radius | 320 Å |
| Specific Surface Area | 28.4 m$^2$/gram |

Treated bulk density is determined by taking a portion of the copolymer beads and swelling them in an excess of toluene to expand the copolymer structure. The swollen copolymer beads are then thoroughly washed by three successive batch-type washes with methanol and finally allowed to dry in air overnight. A portion of the copolymer beads of known weight is then treated with a powdered, silicon dioxide antistatic agent and placed into a graduated cylinder. The graduated cylinder is tapped until a constant volume for the beads is measured. Treated bulk density is the weight of the beads divided by their volume.

Porosity is determined from the treated bulk density data using standard calculations employed in the art.

Average pore radius and specific surface area of the treated copolymer are determined by well-known BET nitrogen adsorption analysis.

ANION-EXCHANGE RESIN PREPARATION

The porous copolymer beads are converted to both strong-base and weak-base anion-exchange resins by conventional methods. A 75 gram portion of the copolymer beads is chloromethylated by placing the beads and 920 milliliters (ml) of chloromethylmethylether into a 1 liter glass reactor. The reactor is equipped with a paddle agitator, heating jacket, addition funnel, and a reflux condenser. The copolymer beads are allowed to swell for 45 minutes and, thereafter, 37.5 grams of ferric chloride as a catalyst is added. The reactor contents are then maintained at a temperature of 53° C. for 3 hours. The resulting chloromethylated beads are washed thoroughly with methanol and then recovered from the reactor.

A 15 gram portion of the methanol-damp, chloromethylated beads is converted to a strong-base anion resin by placing them with an excess amount of a non-halogenated swelling solvent in a glass bottle. The chloromethylated beads are allowed to swell for 30 minutes. A 60 ml portion of a 40 percent aqueous trimethylamine solution is added and the bottle contents are reacted at room temperature overnight. The resulting strong-base resin is washed with water, then with an excess amount of a 5 weight percent aqueous hydrochloric acid solution, and finally with water to a neutral pH.

The strong-base resin is measured to determine various physical and chemical properties. The resin beads have a dry weight capacity of 3.80 meq/g, a water retention capacity in the chloride form of 64.3 percent, a wet volume capacity of 0.88 meq/ml, and an average particle diameter of 1084 μm.

Water retention capacity is determined by swelling a weighed amount of resin with water, removing excess water and weighing the fully swollen resin. The resin is then dried on a moisture balance until a constant weight is obtained. Water retention capacity is the ratio of water imbibed to the total combined weight of the resin plus imbibed water.

Average particle diameter is determined by a photographing the resin beads at a known magnification. The diameters of a statistically significant population of beads, such as at least about 30 beads, are determined by measuring individual beads on the photograph and then adjusting for the magnification used. An average diameter is calculated from the adjusted bead diameters.

Dry weight capacity and wet volume capacity are determined by standard analytical techniques.

The remaining portion of the methanol-damp, chloromethylated beads is converted to a weak-base resin by placing it with 400 grams of water, 18 ml of a 50 weight percent aqueous sodium hydroxide solution, and 112 grams of a 40 weight percent aqueous dimethylamine solution into a Paar bomb reactor. The reactor is sealed and the contents maintained at 90° C. for 4 hours. The resulting weak-base resin beads are recovered from the reactor and sequentially washed with a first water wash, a 5 weight percent aqueous hydrochloric acid solution, a second water wash, a 5 weight percent aqueous sodium hydroxide solution, and finally with a third water wash to a neutral pH.

The weak-base resin is measured to determine various physical and chemical properties. The properties are summarized as follows:

| Weak-base capacity | 0.93 meq/ml |
| Salt-splitting capacity | 0.15 meq/ml |
| Dry weight capacity | 4.35 meq/gram |
| Water retention capacity (OH$^-$ form) | 58.6 percent |
| Shrink/swell (%) | 15 percent |
| Crush Strength | 325 ± 60 grams/bead |
| Average Particle Diameter | 967 μm |

Weak-base capacity, salt-splitting capacity, and dry weight capacity are determined by standard analytical techniques well-known in the art. Water retention capacity and average particle diameter are determined by the procedures previously described.

Shrink/swell is determined by placing a portion of the resin in its free base form in a graduated cylinder filled with water. The graduated cylinder is tapped until the volume of the resin remains at a constant value. Thereafter, the resin is converted to its acid form by contact with a dilute aqueous hydrochloric acid solution and a final water wash. The volume of the resin, in its acid form, is determined in the same manner. Shrink/swell, as a percentage, is calculated by:

$$[(V_{af} - V_{fb})/V_{fb}]*100$$

where:

$V_{af}$ is the volume of the resin in its acid form; and
$V_{fb}$ is the volume of the resin in its free base form.

Crush Strength is determined by taking a statistically representative sample of at least about 30 beads from a given sample of resin or copolymer beads, and determining the force, in grams, needed to fracture each bead using a Chatillon Scale, Model DPP-1KG, available from J. Chatillon & Sons Company. Crush strength is reported as the average of the force measurements obtained for the 30 beads.

EXAMPLE 2

This example concerns preparation of porous copolymer beads from seed particles prepared from t-butylstyrene. The procedure of Example 1 is substantially repeated, except where indicated otherwise. The resulting porous copolymer beads are also converted to a cation-exchange resin, rather than an anion-exchange resin.

SEED PREPARATION

The kettle is charged with a monomer mixture consisting of 1160 grams of t-butylstyrene, 4.2 grams of the divinylbenzene solution, and as free-radical polymerization initiators, 0.58 grams of t-butyl perbenzoate and 2.32 grams of the t-butyl peroctoate solution. The monomer mixture is suspended in an aqueous medium consisting of 3.75 grams of the sodium dichromate solution, 4.7 grams of CMMC, and 1560 grams of water. The monomer mixture is polymerized as in Example 1 to yield cross-linked seed particles having a divinylbenzene content of 0.2 weight percent based on the total weight of the seed particles. The seed particles have the following particle size distribution as determined by screen analysis:

| Particle Diameter (μm) | Weight Percent |
|---|---|
| 841 to 707 | 1.0 |
| 707 to 595 | 27.6 |
| 595 to 500 | 41.7 |
| 500 to 420 | 10.2 |
| 420 to 354 | 9.0 |
| 354 to 297 | 4.2 |
| 297 to 250 | 2.2 |
| less than 250 | 4.0 |

BEAD PREPARATION

A 176 gram portion of the seed particles corresponding to the 595 to 500 μm particle size range of the above-described distribution is used for this example. The seed particles are placed in the kettle along with a second monomer mixture consisting of 433 grams of styrene, 247 grams of the divinylbenzene solution previously described, 320 grams of iso-octane, 1.81 grams of the t-butyl peroctoate solution, 0.60 grams of t-butyl perbenzoate, and 932 grams of water. The seed particles are allowed to imbibe the second monomer mixture for 30 minutes. At this point, a small sample of the imbibed seed particles is obtained from the reactor. The seed particles are examined under a microscope which indicates that the monomer has been substantially imbibed and that the seed particles are separated. Thereafter, 1.5 grams of the sodium dichromate solution and 241 grams of the 1 percent aqueous CMMC solution is added to the kettle. The second monomer mixture is polymerized as in Example 1.

The resulting copolymer beads are opaque in appearance and have a slightly irregular surface. The beads are essentially uniform in size with a volume average particle diameter of 1043 μm. There are no copolymer beads of substantially reduced size present that would indicate poor imbibition of the second monomer mixture.

The porous copolymer beads are measured to determine physical properties. The beads have a treated bulk density of 0.539 g/cm$^3$ and a porosity of 0.267 cm$^3$/g. The treated beads have an average pore radius of 103 Å and a specific surface area of 13.5 m$^2$/g as measured by BET analysis.

Figure 2:
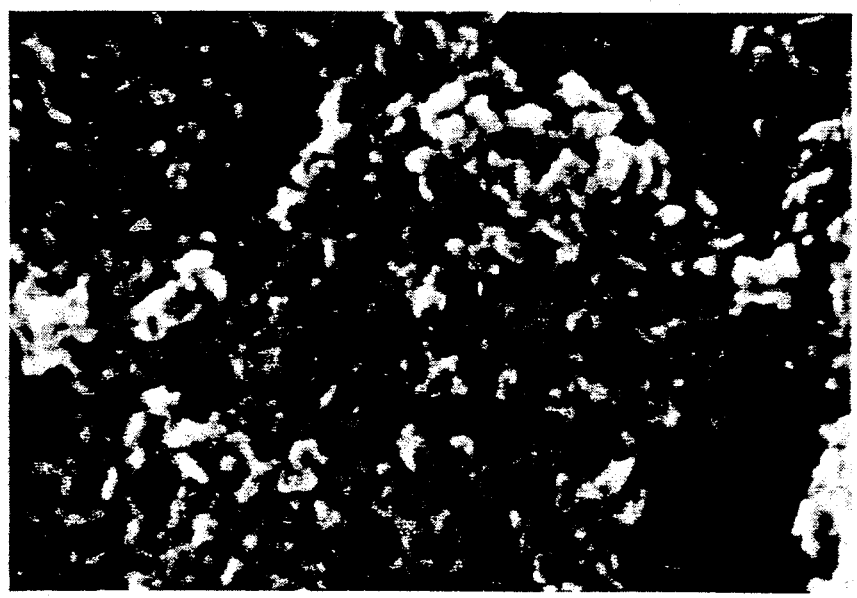
FIG. 2 is a photomicrograph of a conventional macroporous copolymer bead.

The porosity of the porous copolymer beads is illustrated by FIG. 1 which is a scanning electron photomicrograph taken of a bead cross-section at 20,800×magnification. The porous copolymer beads prepared by this example have a relatively "fine" porosity, i.e., the pore sizes are fairly uniform and somewhat smaller in comparison to a conventional (non-seeded) macroporous copolymer as depicted by FIG. 2. FIG. 2 is a scanning electron photomicrograph taken at a magnification of 20,600×.

CATION-EXCHANGE RESIN PREPARATION

The porous copolymer beads are converted to a cation-exchange resin by conventional sulfonation. A 50 gram portion of the copolymer beads is allowed to swell for 30 minutes with an excess of a halogenated swelling solvent and concentrated 99 weight percent sulfuric acid. The swollen copolymer beads are then heated to a temperature of 100° C. which is maintained for 2 hours.

The resulting sulfonated beads are hydrated gradually by rinsing them with successive washes of increasingly dilute aqueous sulfuric acid solutions and finally with water to a neutral pH. The washed beads are converted to resin in the calcium form by contact with an excess of a saturated calcium hydroxide solution. Thereafter, the resin beads are thoroughly washed with water to a neutral pH.

The cation-exchange resin is measured to determine various physical and chemical properties. The resin beads have a dry weight capacity of 4.82 meq/g, a water retention capacity in the calcium form of 53 percent, a volume average particle diameter of 1266 μm, and a crush strength of 315 g/bead. With respect to osmotic shock resistance, the percentage of whole perfect beads (WPB) is 97 percent after 10 cycles of successive washes as follows: 1) 8N sodium hydroxide, 2) water, 3) 8N hydrochloric acid, and 4) water.

EXAMPLE 3

This example concerns preparation of porous copolymer beads from seed particles prepared with a mixture of laurylmethacrylate and isobornylmethacrylate. The procedure of Example 1 is substantially repeated, except where indicated otherwise. The resulting porous copolymer beads are converted to an anion-exchange resin as in Example 1 and also to a sulfonated cation-exchange resin as in Example 2.

SEED PREPARATION

The polymerization kettle is charged with a monomer mixture consisting of 232 grams of laurylmethacrylate, 928 grams of isobornylmethacrylate, 4.2 grams of the divinylbenzene solution, and as free-radical polymerization initiators, 0.58 grams of t-butyl perbenzoate and 2.32 grams of the t-butyl peroctoate solution. The monomer mixture is suspended in an aqueous medium consisting of 2.5 grams of the aqueous sodium dichromate solution, 360 grams of the 1 percent aqueous CMMC solution, and 840 grams of water. The monomer mixture is polymerized as in Example 1 to yield cross-linked seed particles having a divinylbenzene content of 0.2 weight percent based on the total weight of the seed particles. The seed particles have the following particle size distribution as determined by screen analysis:

| Particle Diameter (μm) | Weight Percent |
| --- | --- |
| greater than 420 | 1.2 |
| 420 to 354 | 2.6 |
| 354 to 297 | 14.9 |
| 297 to 250 | 22.5 |
| 250 to 177 | 33.3 |
| less than 177 | 25.5 |

CATION-EXCHANGE RESIN PREPARATION

A 160 gram portion of the seed particles having diameters from 297 to 177 μm is used for this portion of the example. The seed particles are placed in the kettle along with 775 grams of water and 0.26 grams of a 30 percent aqueous sodium laurylsulfate solution. A second monomer mixture consisting of 346 grams of styrene, 198 grams of the divinylbenzene solution previously described, 256 grams of iso-octane, 1.45 grams of the t-butyl peroctoate solution, and 0.48 grams of t-butyl perbenzoate is added at a constant rate to the kettle over a 2.5 hour period. The seed particles are allowed to imbibe the second monomer mixture for an additional 45 minutes. Thereafter, 2.5 grams of the sodium dichromate solution and 223 grams of the 1 percent aqueous CMMC solution is added to the kettle. The second monomer mixture is polymerized as in Example 1. The resulting porous copolymer beads are somewhat opaque. All other procedures are substantially similar to those of Example 1. The porous copolymer beads have a treated bulk density of 0.611 g/cm$^3$ and a porosity of 0.175 cm$^3$/g.

The porous copolymer beads are converted to a sulfonated cation-exchange resin by substantially following the procedure of Example 2. The sulfonated cation-exchange resin has a dry weight capacity of 4.92 meq/g, a water retention capacity in the calcium form of 50.4 percent, a volume average particle diameter of 480 μm, and a crush strength of 59 g/bead. With respect to osmotic shock resistance, the number of WPB is 99 percent.

ANION-EXCHANGE RESIN PREPARATION

A 75 gram portion of the seed particles having diameters from 297 to 177 μm is used in this portion of the example. The seed particles are placed in the kettle along with 364 grams of water and 0.12 grams of a 30 percent aqueous sodium laurylsulfate solution. A second monomer mixture consisting of 218 grams of styrene, 37 grams of the divinylbenzene solution previously described, 120 grams of Soltrol 10 (a mixture of isoparafinic solvents available from the Phillips 66 Company, 0.68 grams of the t-butyl peroctoate solution, and 0.23 grams of t-butyl perbenzoate is added at a constant rate to the kettle over a 20-minute period. The seed particles are allowed to imbibe the second monomer mixture for 6.5 hours. Thereafter, 1.2 grams of the sodium dichromate solution, 1 gram of Antifoam B available from the Dow Corning Company, and 105 grams of the 1 percent aqueous CMMC solution are added to the kettle. The seed particles and second monomer mixture are polymerized as in Example 1. The resulting porous copolymer beads appear opaque. All other procedures are substantially similar to those of Example 1. The beads are not analyzed to determine treated bulk density, porosity, average pore diameter, or specific surface area.

A 75 gram portion of the porous copolymer beads is converted to a strong-base anion-exchange resin by substantially repeating the procedure of Example 1. The strong-base anion-exchange resin has a dry weight capacity of 4.85 meq/g, a water retention capacity in the chloride form of 48.3 percent, and a volume average particle diameter of 677 μm. The beads have a Chatillon crush strength of 171 grams/bead and an osmotic shock resistance of 100 percent WPB.

The remaining portion, about 140 grams, of the porous copolymer beads is converted to a weak-base anion-exchange resin by substantially repeating the procedure of Example 1. After chloromethylation, the beads are placed into the Paar bomb reactor with 32 grams of water, 35.5 grams of a 50 weight percent aqueous sodium hydroxide solution, and 143 grams of the dimethylamine solution. All remaining procedures are substantially similar to those of Example 1.

The resulting weak-base resin has the following properties:

| | |
| --- | --- |
| Weak-base capacity | 1.60 meq/ml |
| Salt-splitting capacity | 0.08 meq/ml |
| Dry weight capacity | 4.39 meq/g |
| Water retention capacity (Cl$^-$ form) | 41.6 percent |
| Shrink/swell (percent) | 20.5 percent |
| Crush Strength | 797 g/bead |
| Volume Average Particle Diameter | 556 μm |
| Osmotic Shock Resistance | 100 percent WPB |
| Non-Treated Bulk Density | 0.66 g/cm$^3$ |

Figure 3:
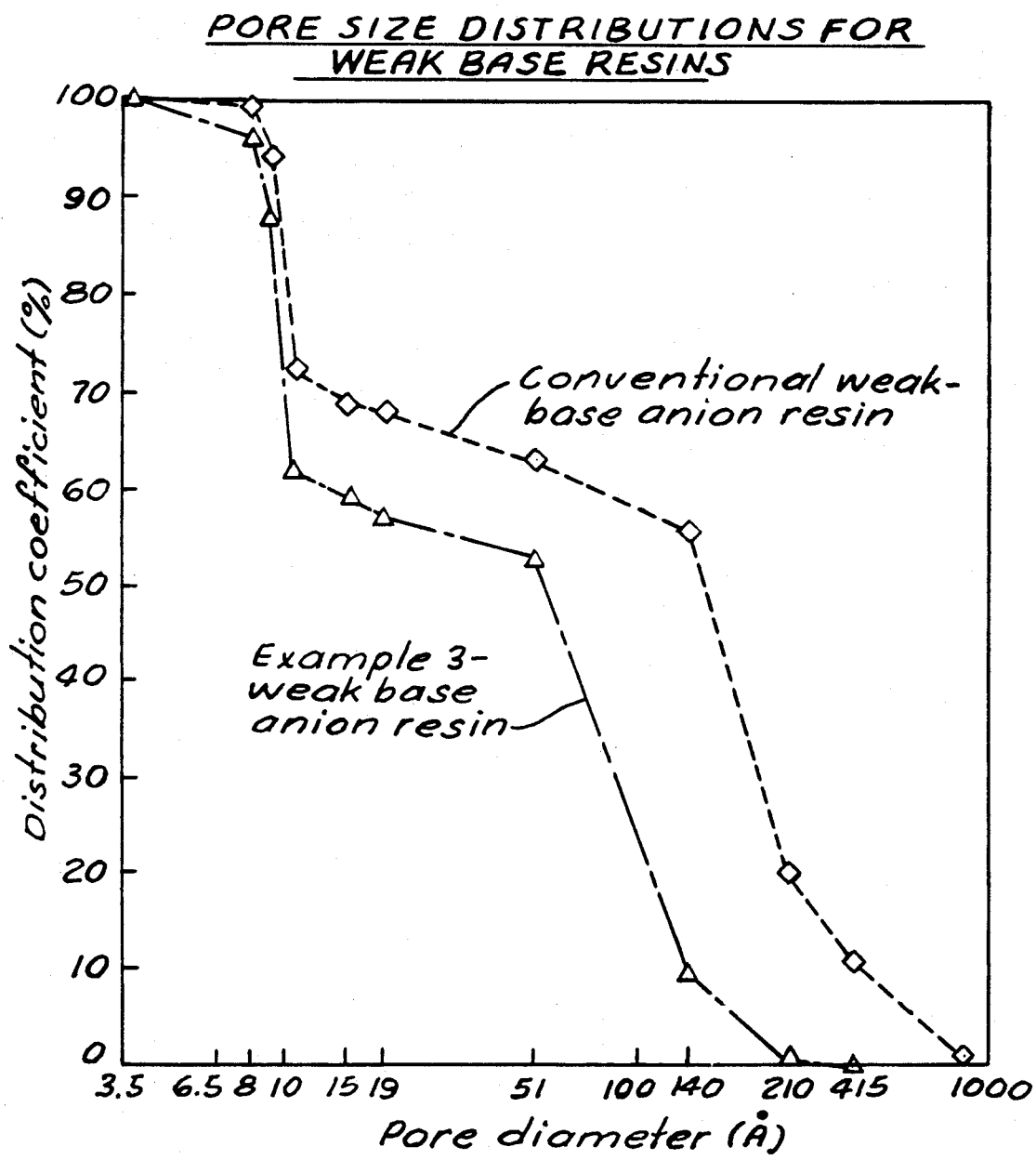
FIG. 3 is a graph which plots the distribution of pore sizes, as a percentage, versus pore diameter in Å for the weak-base anion-exchange resin prepared in Example 3. The distribution for a conventional weak-base anion resin is also shown.

The pore size distribution (as determined by size exclusion chromatography) of the weak-base anion-exchange resin prepared by this example is shown in FIG. 3. The figure also compares the pore size distribution of the present weak-base anion resin with that of a conventional macroporous weak-base anion resin. The distributions show that the resin of the present invention has a greater proportion of pores with a size below about 140 Å or less compared to the conventional resin.

Figure 4:
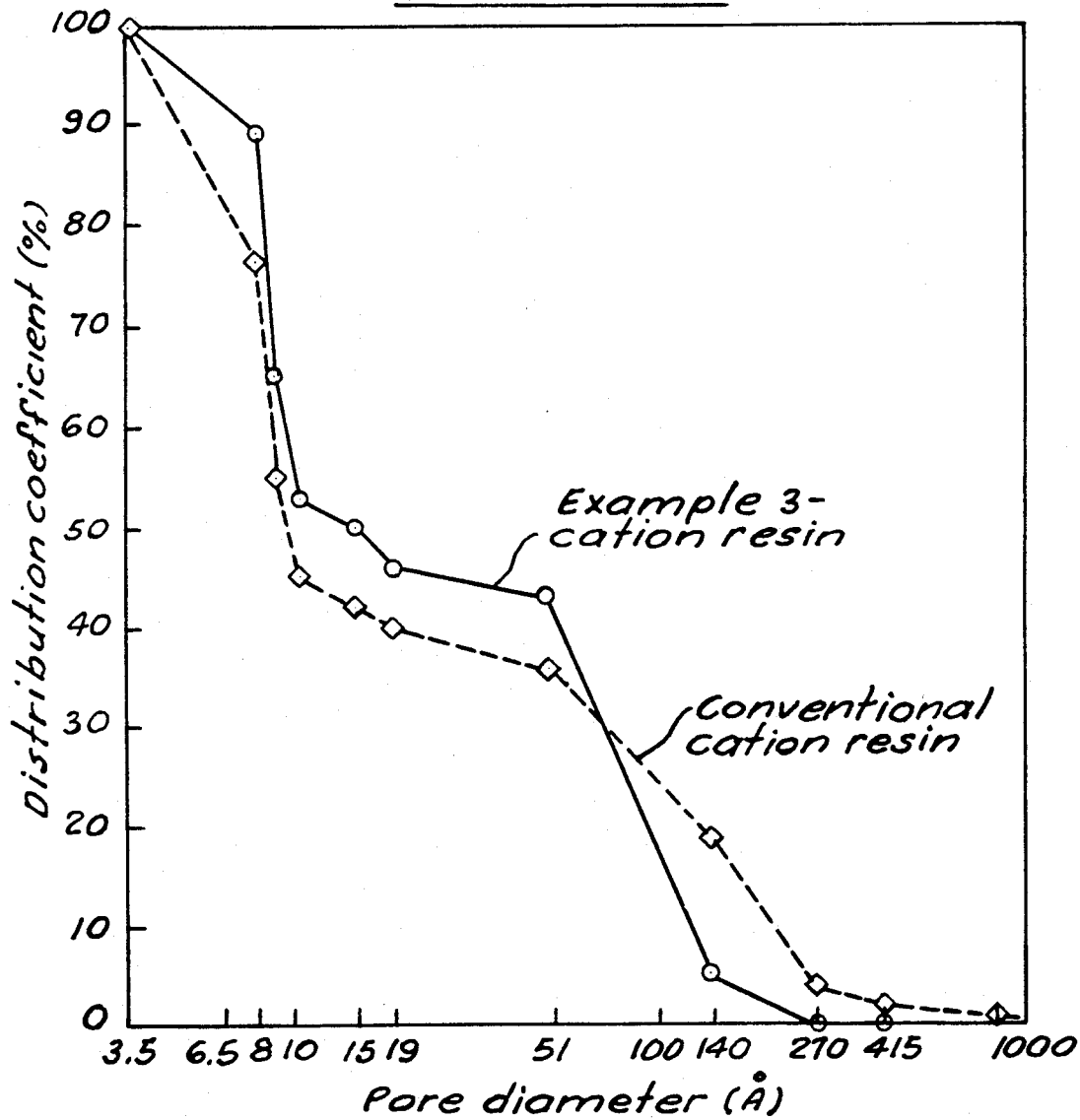
FIG. 4 is a graph which plots the distribution of pore sizes, as a percentage, versus pore diameter in Å for the sulfonated cation-exchange resin prepared in Example 3. The distribution for a conventional sulfonated cation resin is also shown.

FIG. 4 shows the pore size distribution of the sulfonated cation resin prepared by this example and compares it with that of a conventional sulfonated cation resin. Similarly, the distributions of FIG. 4 show that the cation resin of the present invention has a greater proportion of pores with a size below about 140 Å or less compared to the conventional resin.

In FIGS. 3 and 4, the distribution coefficient is a number which indicates the portion (as a percentage) of pores in a bead which have a given pore diameter. For example in FIG. 3, the curve associated with the weak-base resin of the invention indicates that approximately 52 percent of the pores in a bead have a diameter greater than or equal to 51 Å.

EXAMPLE 4

This example concerns preparation of porous copolymer beads by seeded polymerization of gel copolymer seeds prepared from vinyltoluene. The procedure followed is substantially similar to that of Example 1, except as otherwise indicated.

SEED PREPARATION

A first monomer mixture consisting of 1160 grams of vinyltoluene available from The Dow Chemical Company, 4.2 grams of the divinylbenzene solution, and as free-radical polymerization initiators, 0.58 grams of t-butyl perbenzoate and 2.32 grams of a 50 percent solution of t-butyl peroctoate, is added to the kettle and suspended in an aqueous medium. The aqueous medium consists of 3.75 grams of the 60 percent aqueous solution of sodium dichromate as a latex inhibitor, 375 grams of the 1 percent aqueous carboxymethylmethylcellulose (CMMC) solution, and 875 grams of water. The monomer mixture is polymerized as in Example 1. The resulting seed particles have a divinylbenzene content of 0.2 percent based on the weight of the monomer. The kettle contains some popcorn polymer (a waste product) which is removed by screening out particles larger than 707 μm.

The seed particles obtained have the following particle size distribution as determined by a screen analysis:

| Particle Diameter (μm) | Weight Percent |
| --- | --- |
| 707 to 595 | 1.8 |
| 595 to 500 | 25.3 |
| 500 to 420 | 31.0 |
| 420 to 354 | 24.6 |
| 354 to 297 | 8.3 |
| 297 to 250 | 3.3 |
| less than 250 | 5.7 |

BEAD PREPARATION

A 200 gram portion of the seed particles corresponding to the 595 to 354 μm particle size range of the above-described distribution is used in this example. The seed particles are placed in the kettle along with 932 grams of water. A second monomer mixture consisting of 346 grams of styrene, 198 grams of the divinylbenzene solution previously described, 256 grams of iso-octane, 1.45 grams of the t-butyl peroctoate solution, and 0.48 grams of t-butyl perbenzoate is added gradually to the kettle over a 30-minute period. The seed particles are then allowed to imbibe the second monomer mixture for 6 hours. Thereafter, 1.5 grams of the sodium dichromate solution and 241 grams of the 1 percent CMMC solution are added. The seed particles and second monomer mixture are polymerized as in Example 1 and measured to determine physical properties. The porous copolymer beads have a treated bulk density of 0.593 g/cm$^3$ and a porosity of 0.158 cm$^3$/g.

The porous copolymer beads are converted to a sulfonated cation-exchange resin by substantially following the procedure of Example 2. The resin has a dry weight capacity of 4.76 meq/g, a water retention capacity in the calcium form of 49.2 percent, a volume average particle diameter of 962 μm, and a crush strength of 570 g/bead. With respect to osmotic shock resistance, the number of WPB is 99 percent.

What is claimed is:

1. A process for making porous copolymer beads comprising:
   (a) providing a plurality of gel-type, copolymer seed particles prepared by polymerization of a first monomer mixture comprising at least one first monovinylidene monomer and a first cross-linking monomer, the seed particles optionally containing a free-radical source therein capable of initiating polymerization of ethylenically unsaturated monomers;
   (b) imbibing the seed particles with a second monomer mixture comprising a phase-separating diluent, at least one second monovinylidene monomer, a second cross-linking monomer, and a free-radical initiator, the free-radical initiator being optional where the seed particles contain the free radical source, the phase-separating diluent and second monovinylidene monomer having a solubility parameter and dipole moment which are compatible with the corresponding solubility parameter and dipole moment of the at least one first monovinylidene monomer such that at least about 70 percent by weight of the second monomer mixture is imbibed by the seed particles; and
   (c) maintaining the imbibed seed particles under suspension polymerizing conditions for a time sufficient to polymerize the second monomer mixture to a desired degree of conversion and obtain porous copolymer beads.

2. The process of claim 1 wherein the seed particles are prepared by in situ suspension polymerization of a first monomer mixture comprising the at least one first monovinylidene monomer and the first cross-linking monomer within a continuous suspending medium.

3. The process of claim 2 wherein conversion of the at least one first monovinylidene monomer and the first cross-linking monomer is from about 50 to about 90 percent based on total weight of the monomers in the first monomer mixture.

4. The process of claim 1 wherein step (a) further comprises suspending the seed particles within a continuous suspending medium.

5. The process of claim 1 wherein the at least one first monovinylidene monomer is selected from t-butylstyrene, vinyltoluene, ethylvinylbenzene, laurylmethacrylate, or isobornylmethacrylate.

6. The process of claim 1 wherein the first cross-linking monomer is divinylbenzene, trivinylbenzene, ethylene glycol dimethacrylate, or mixtures thereof.

7. The process of claim 1 wherein the seed particles comprise from about 95 to about 99.99 weight percent of the at least one first monovinylidene monomer and from about 0.01 to about 5 weight percent of the first cross-linking monomer based on total weight of the monomers.

8. The process of claim 1 wherein the seed particles have a volume average particle diameter of from about 75 to about 1000 μm.

9. The process of claim 1 wherein the seed particles have a $T_g$ of at least about 30° C.

10. The process of claim 1 wherein the at least one second monovinylidene monomer is selected from styrene, alkyl-substituted styrenes, or vinylbenzylchloride.

11. The process of claim 1 wherein the at least one second monovinylidene monomer is styrene.

12. The process of claim 1 wherein the second cross-linking monomer is divinylbenzene.

13. The process of claim 1 wherein the second monomer mixture has from about 75 to about 97 weight percent of the at least one second monovinylidene monomer and from about 3 to about 25 weight percent of the second cross-linking monomer, based on total weight of monomers in the second monomer mixture.

14. The process of claim 1 wherein the gel seed copolymer particles comprise from about 10 to about 40 percent by weight of the porous copolymer beads.

15. The process of claim 5 wherein the phase-separating diluent is selected from hexane, heptane, or iso-octane.

16. The process of claim 5 wherein the phase-separating diluent is iso-octane.

17. The process of claim 1 wherein the solubility parameters of the phase-separating diluent and the at least one second monovinylidene monomer are within about ±20 percent of the solubility parameter for the at least one first monovinylidene monomer.

18. The process of claim 1 wherein the solubility parameters of the phase-separating diluent and the at least one second monovinylidene monomer are within about ±10 percent of the solubility parameter for the at least one first monovinylidene monomer.

19. The process of claim 1 wherein the dipole moments of the phase-separating diluent and the at least one second monovinylidene monomer are within ±1 debyes of the dipole moment for the at least one first monovinylidene monomer.

20. The process of claim 1 wherein the dipole moments of the phase-separating diluent and the at least one second monovinylidene monomer are within ±0.25 debyes of the dipole moment for the at least one first monovinylidene monomer.

21. The process of claim 1 wherein the seed particles imbibe at least about 95 percent by weight of the second monomer mixture.

22. The process of claim 1 wherein the phase-separating diluent is present in an amount from about 20 to about 50 weight percent based on total weight of the second monomer mixture.

23. The process of claim 1 wherein the porous copolymer beads have a volume average particle diameter of from about 95 to about 1700 μm.

24. The process of claim 1 wherein the porous copolymer beads have a treated bulk density of from about 0.2 to about 0.6 g/cm$^3$.

25. The process of claim 1 wherein the porous copolymer beads have a specific surface area of from about 2 to about 75 m$^2$/g.

26. The process of claim 1 wherein a swelling ratio of from about 3 to about 5 is obtained.

27. The process of claim 1 further comprising: (d) functionalizing the porous copolymer beads with ion-exchange functional groups to obtain an ion-exchange resin.

28. The process of claim 27 wherein the ion-exchange functional groups are anion-exchange groups, cation-exchange groups, or chelate-exchange groups.

29. A porous copolymer bead prepared by the process of claim 1.

30. An ion-exchange or chelate-exchange resin prepared by the process of claim 27.

* * * * *